United States Patent [19]
Kerley, Jr.

[11] Patent Number: 4,946,421
[45] Date of Patent: Aug. 7, 1990

[54] ROBOT CABLE-COMPLAINT DEVICES

[75] Inventor: James J. Kerley, Jr., Greenbelt, Md.

[73] Assignee: United States of America as represented by the Administrator, National Aeronautics & Space Administration, Washington, D.C.

[21] Appl. No.: 193,612

[22] Filed: May 13, 1988

[51] Int. Cl.⁵ .............................................. F16D 3/50
[52] U.S. Cl. .......................................... 464/56; 901/28
[58] Field of Search ...................... 464/51, 55, 56, 81; 901/15, 16, 21, 28, 29, 41, 45

[56] References Cited

U.S. PATENT DOCUMENTS

| | | | |
|---|---|---|---|
| 1,672,398 | 6/1928 | Treschow | 464/56 |
| 3,087,313 | 4/1963 | Kerley, Jr. | 464/55 X |
| 3,204,943 | 9/1965 | Kerley, Jr. | 4a64/56 X |
| 3,238,744 | 3/1966 | Camossi | 464/56 |
| 3,238,745 | 3/1966 | Burroughs | 464/56 |
| 3,885,295 | 5/1975 | Engelberger et al. | 29/429 |
| 4,202,107 | 5/1980 | Watson | 33/169 C |
| 4,439,926 | 4/1984 | Whitney et al. | 33/185 R |

OTHER PUBLICATIONS

"Concepts and Effects of Damping in Isolators", James Kerley, Jr.

Primary Examiner—Daniel P. Stodola
Attorney, Agent, or Firm—R. Dennis Marchant; John R. Manning; Ronald F. Sandler

[57] ABSTRACT

A cable-compliant robotic joint includes two "U" configuration cross-section brackets with their "U" cross-sections lying in different planes, one of the brackets being connected to a robot arm and the other to a tool. Additional angle brackets are displaced from the other brackets at corners of the robotic joint. All the brackets are connected by cable segments which lie in one or more planes which are perpendicular to the direction of tool travel as it approaches a work object. The compliance of the joint is determined by the cable segment characteristics, such as their length, material, angle, stranding, pre-twisting and pre-stressing.

8 Claims, 13 Drawing Sheets

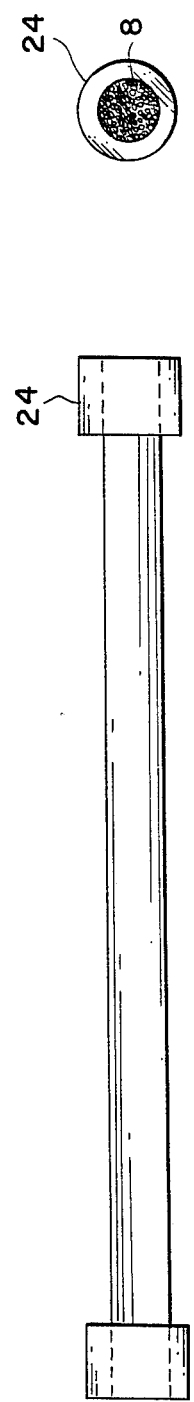
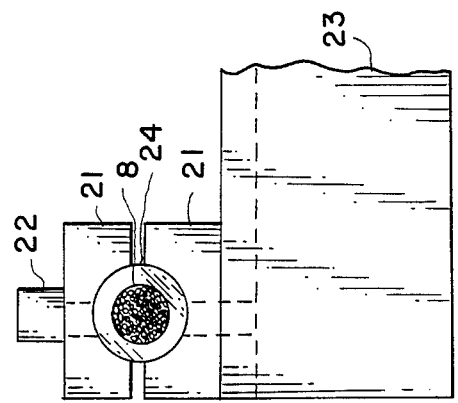
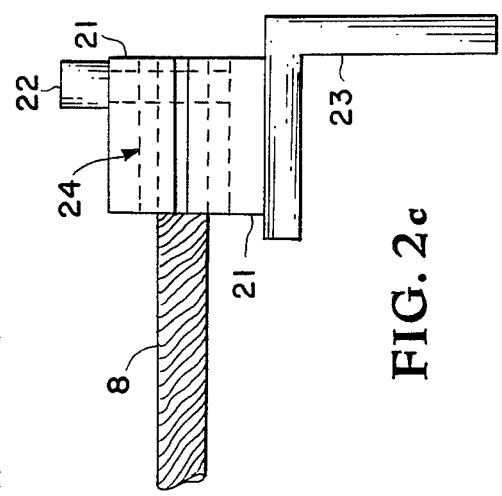

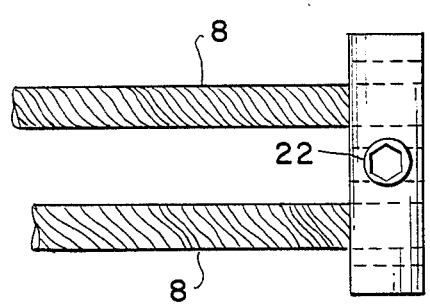
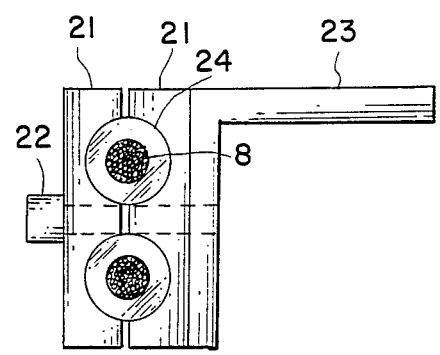
FIG. 3a         FIG. 3b
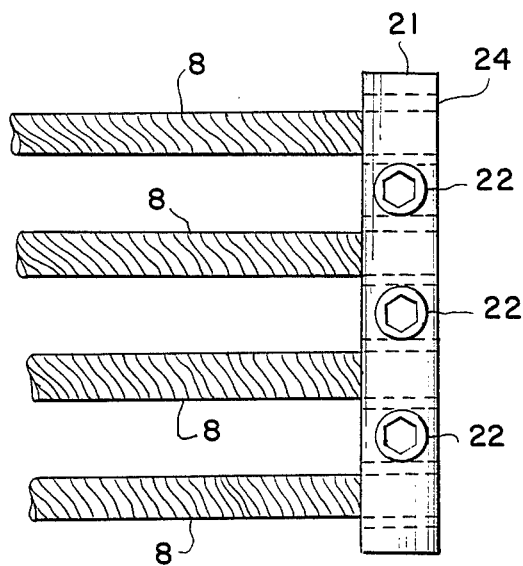
FIG. 4

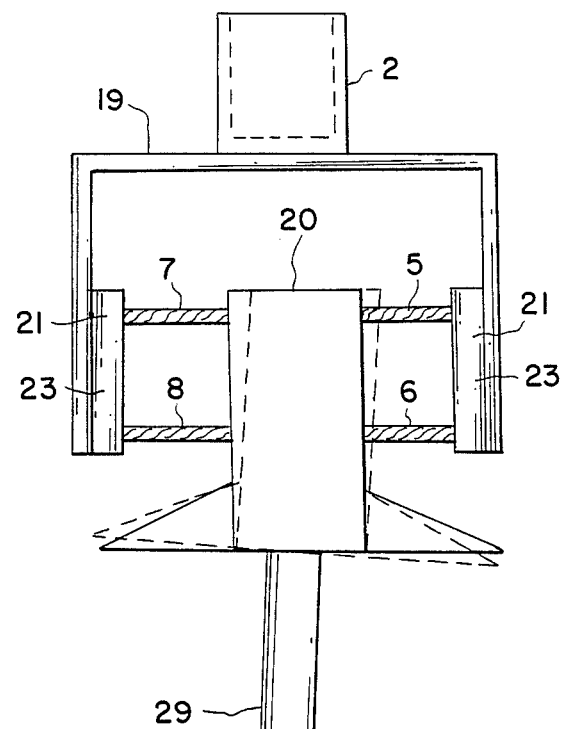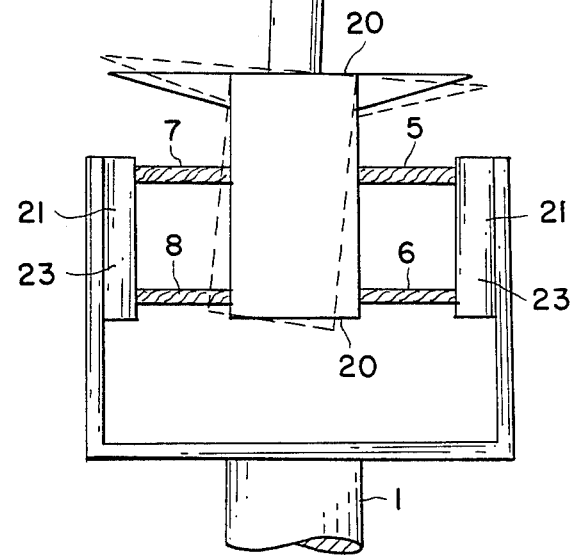
FIG. 9

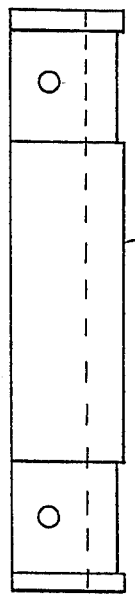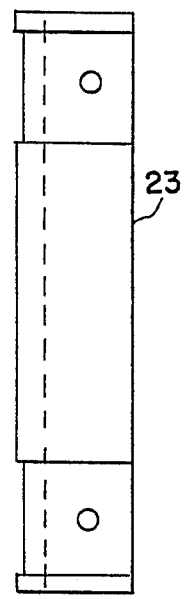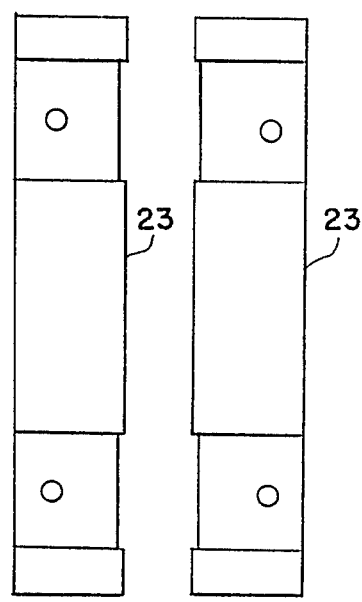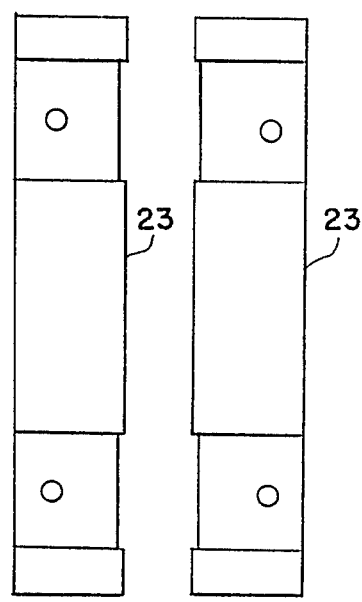
FIG. 11b   FIG. 11c   FIG. 11e   FIG. 11f
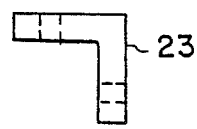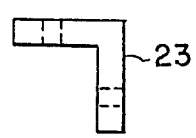
FIG. 11a   FIG. 11d

ROBOT CABLE-COMPLAINT DEVICES

ORIGIN OF THE INVENTION

The invention described herein was made by an employee of the United States Government, and may be manufactured and used by or for governmental purposes without the payment of any royalties thereon or therefor.

TECHNICAL FIELD

The invention pertains to cable-compliant devices for robots and, more particularly, to robot compliant joints which include cables.

BACKGROUND ART

Numerous mechanical and electro-mechanical compliant devices have been developed in the course of the evolution of robot technology. These compliant devices, along with the software programs that sense and control the robot operations, greatly influence the overall robot performance, which is often related to the ability of the robot to acquire a work object and perform one or more simple mechanical tasks. In many robot operations, these compliant devices, to perform adequately, should exhibit non-linear, variable, and/or adjustable compliance, a plurality of degrees of freedom, provide damping, have some degree of shock and/or vibration protection, and be able to correct for variations in misalignments between the device and a mechanism to be worked on.

Among the prior art devices which serve as robot joints or end-effect connectors are manipulators used for tooling operations which exhibit compliance and some limited degree of damping where the compliance is obtained through springs which are axial with respect to the transverse direction of the tool motion. This kind of manipulator is not useful where large angular and translational motions are require. Other manipulators are rigid, linear force systems. They have no damping or shock and vibration protection capability. Still other manipulators employ wires or cables which are mounted in an axis which is parallel to the major axis of its tool and which are rigid enough to support the tool and yet give the manipulator some compliance and damping and limited self-alignment capability. This cable configuration, however, severly limits the torquing capability of the manipulator. If the supporting members are made more rigid, as they are in some devices, the device can not withstand substantial shock and vibration and will have problems with binding when its tool and the work piece are not aligned. Still other prior art devices employ spring systems to develop compliance which may be linear or non-linear and subject to a threshold. The prior art does not include a robot joint with a high level of damping, six degrees of freedom, the ability to acquire a work object with substantial side and angular misalignment between the tool and the work object, the ability to provide position feedback for alignment correction, variable and adjustable compliance, high load capability and stackability.

STATEMENT OF THE INVENTION

Accordingly, it is an object of this invention to provide a robotic joint with variable compliance.

It is another object of the invention to provide a robotic joint with adjustable compliance.

It is yet another object of the invention to provide a robotic joint with a high level of damping.

It is still another object of the invention to provide a robotic joint with at least six degrees of freedom that allows for the acquisition of a work object when substantial side and angular misalignment exists.

It is still a further object of the invention to provide position feedback for alignment correction.

It is another object of the invention to provide a robotic joint with a high load capability.

It is yet another object of the invention to provide a robotic joint that is stackable with other robotic joints.

Briefly, these and other objects are achieved in a robotic joint which includes a plurality of brackets, at least two of which have a cross-section which has a "U" or "C" configuration and with these cross-sections being in substantially different, orthogonal planes, one of said brackets being connected to a robot arm and the other of said bracket being connected to a tool with a major axis, said plurality of brackets having means to support a plurality of cable segments, said segments having longitudinal axes which all lie substantially in a plane which is orthogonal to said planes of said bracket "U" or "C" cross-sections and perpendicular to said tool major axis, which may be defined as the general direction that the tool must travel to approach the work object.

BRIEF DESCRIPTION OF THE DRAWINGS

FIGS. 2a and 2b depict front and end views, respectively, of a swaged cable segment.

FIGS. 2c and 2d depict front and end views, respectively, of a swaged cable segment with a cable end retainer having its bolt through the end of the retainer.

FIGS. 3a and 3b show front and end views, respectively, of an alternate cable and retainer configuration with a bolt through the center of the retainer.

FIG. 4 shows a partial side view of cable segments in a four cable set configuration.

FIG. 9 is a universal joint comprised of two individual robotic joints.

FIGS. 11a through 11f show two respective front, top and side views that illustrate how the configuration angles may be varied to vary the compliance of the joint.

DETAILED DESCRIPTION OF THE INVENTION

Figure 1:
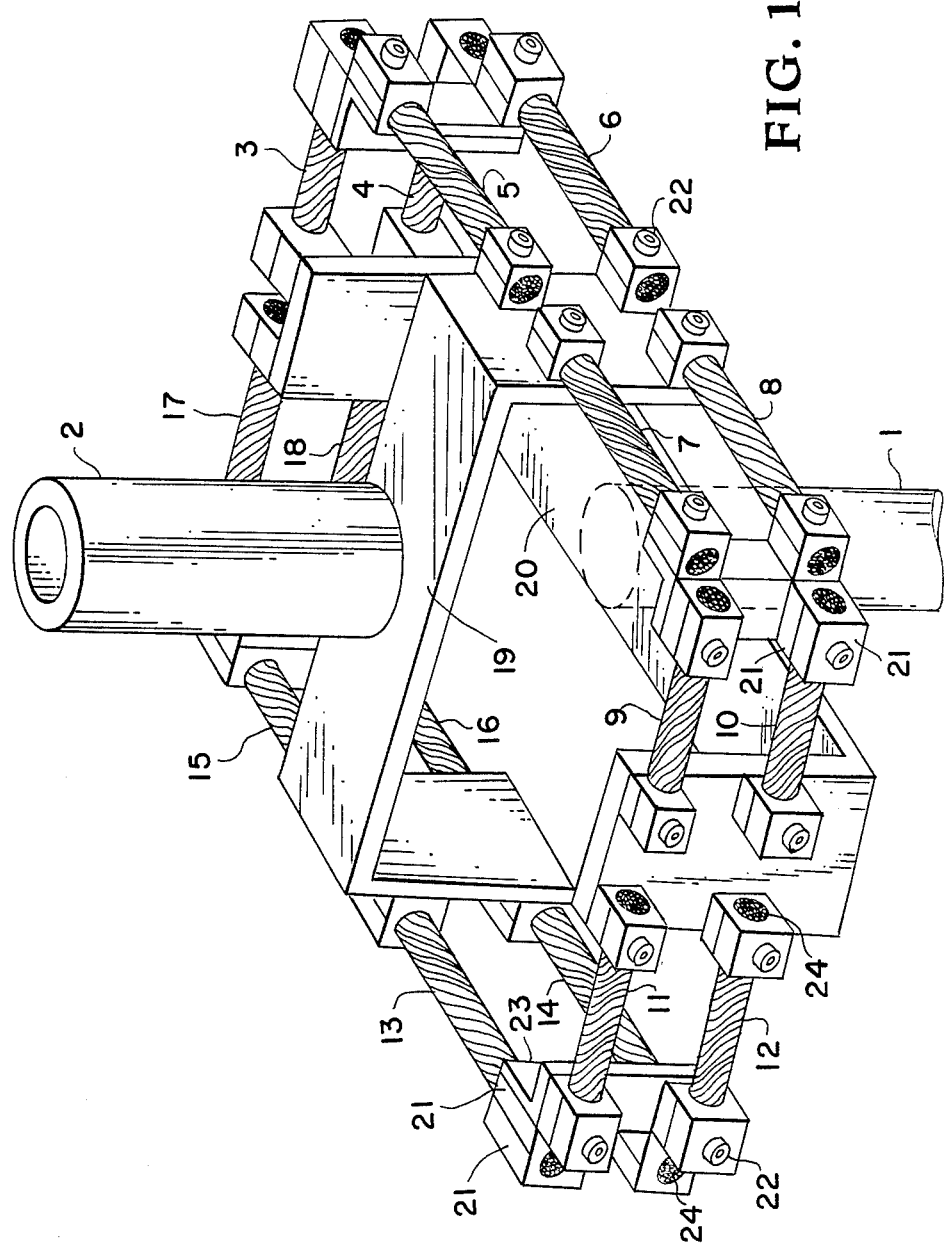
FIG. 1 is a three-dimensional representation of the cable-compliant robotic joint of this invention with a socket wrench mounted thereon.

One embodiment of the robotic joint of the invention is depicted in FIG. 1. The joint is shown as intervening between a robot arm 1 and a socket wrench 2 is representative of a number of tools which could be employed. The robot arm is connected to a robot arm frame 20 while the wrench is connected to a tool frame control 19. Both the robot arm frame 20 and the tool frame control 19 are "U" or "C" configuration brackets with "U" or "C" configuration cross-sections. These cross-sections are in different planes which are orthogonal with respect to each other. Four brackets or angles 23 are suspended at the four corners of the joint. Each one of the angles, as well as the robot arm frame 20 and the tool frame control 19, i.e., the brackets, include four cable end retainers 21. Each of the cable end retainers is provided with a bolt 22 for fastening the retainers to an angle or bracket as well as applying pressure within the retainer to allow the retainer to act as a clamp, each of the retainers having a cylindrical bore. In FIG. 1, the bolts go through the cable segments and the retainers and into the angles and brackets, with the retainers having separate halves. The retainer halves are configured so that they can be tightened down upon the cable segments and still maintain a gap. Adjacent end retainers, from angle to bracket and from bracket to angle are employed to clamp cable segments 3 through 18, the cable segments being suitably stiff to maintain the joint in an essentially box-like configuration. While FIG. 1 depicts two sets of cable segments, each set lying in a different plane which is perpendicular to, and displaced along, the longitudinal axis of the robot arm 1 and the socket wrench 2, it should be understood that any number of such segments sets may be employed. Each cable segment is provided with a copper swage 24 at each end which extends, in essence, for the length of the cylindrical bore to provide a more secure clamp when the segment ends are placed into their respective cable end retainers 21.

It is the cable segments themselves, as well as their configuration, which are critical in terms of establishing the compliance characteristics of the joint. The compliance of the joint may be varied by varying cable segment lengths and stranding, pre-twisting the cable, varying the spacing of the cable sets, the number of cable sets, the cable diameter, the cable material and angle between cable segments.

These segment lengths can be varied by hand, on assembly, including the use of adjustment mechanisms such as worm drives, hydraulics or pneumatics or by changing segment angles. These adjustment mechanisms can be operated remotely such as by driving a worm drive with a servo-motor.

In the remaining figures, the same numbers generally refer to the same elements. FIGS. 2a and b show front and end views, respectively of a cable segment with its swaged ends 24. FIGS. 2c and 2d show another retainer configuration in which a top view and an end view of a cable end retainer 21 is depicted with its bolts 22 is shown as going through the edge of the retainer, rather than through a swaged end of the cable segment as shown in FIG. 1. FIGS. 3a and 3b illustrate front and end views, respectively, of another retainer configuration where the retainer 21 is a double cable holder which clamps swaged ends 24. In this configuration the bolt 22 goes through the middle of the retainer 21 into angle 23. Similarly, FIG. 4 shows still another retainer configuration where the retainer is clamping four cable ends and multiple bolts 22 go through the retainer 21 and between the swaged ends 24. FIG. 4 also illustrates that there can be any number of cable sets, beyond the two cable sets shown in FIG. 1.

Figure 5A:
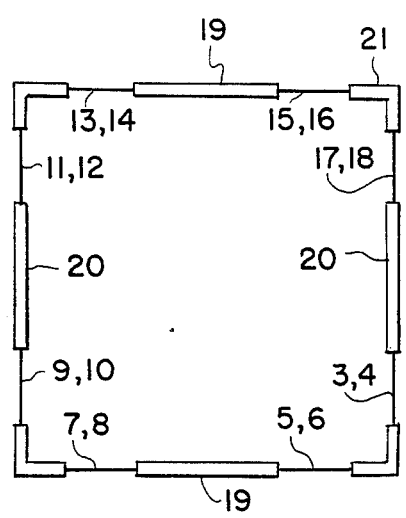
FIGS. 5a through 5e are top and side views of various cable arrangements that may be made to vary the compliance of the invention.
Figure 5B:
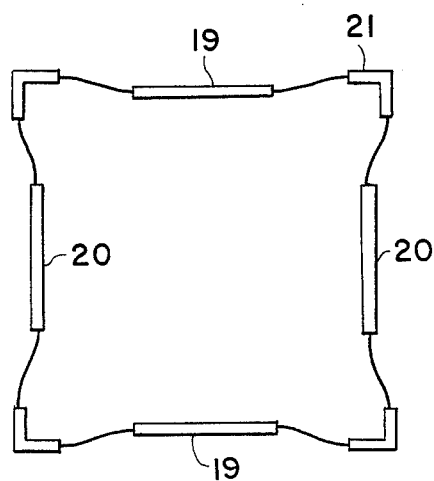
Figure 5C:
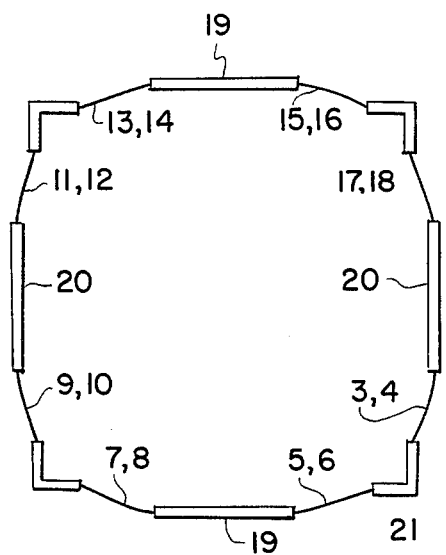
Figure 5D:
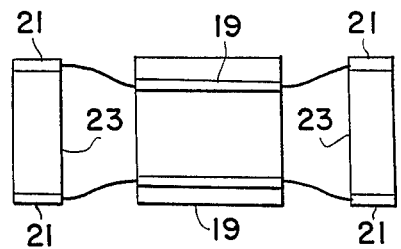
Figure 5E:
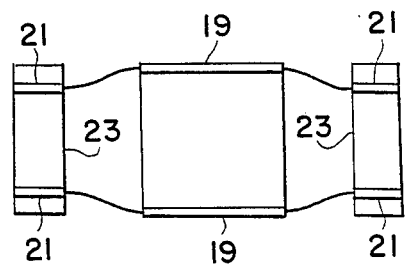

FIGS. 5a through 5e illustrate that the compliance of a cable-compliant robotic joint, as shown in FIG. 1, may be varied along the "X" and "Y" axes by varying cable lengths and the relative angles between cable segments as they exist between the various brackets and retainers of the joint. The axes notations for these figures correspond to the axes notations of FIG. 1. In FIGS. 5a through 5c the joint is viewed along the "Z" axis. FIG. 5a shows a joint configuration where the cable segments are cut to achieve a square configuration and, by definition, standard compliance, as is also shown in FIG. 1. FIG. 5b depicts a configuration where the cable segments may be elongated to achieve compliance above the standard. FIG. 5c shows another configuration where the cable segments may be shortened to achieve less compliance than the standard. FIGS. 5d and 5e illustrate joint configurations as viewed along the "Y" axis. These figures show how the angles between cable segments going from given bracket to a given angle may be varied to increase compliance along the "Z" axis, as shown in FIG. 5d, or decrease compliance along the "Z" axis, as shown in FIG. 5e. It should be understood, that while general techniques are disclosed for varying compliance along one or more axis, a change which is directed to changing compliance along a given axis will inherently effect other axes.

Figure 6:
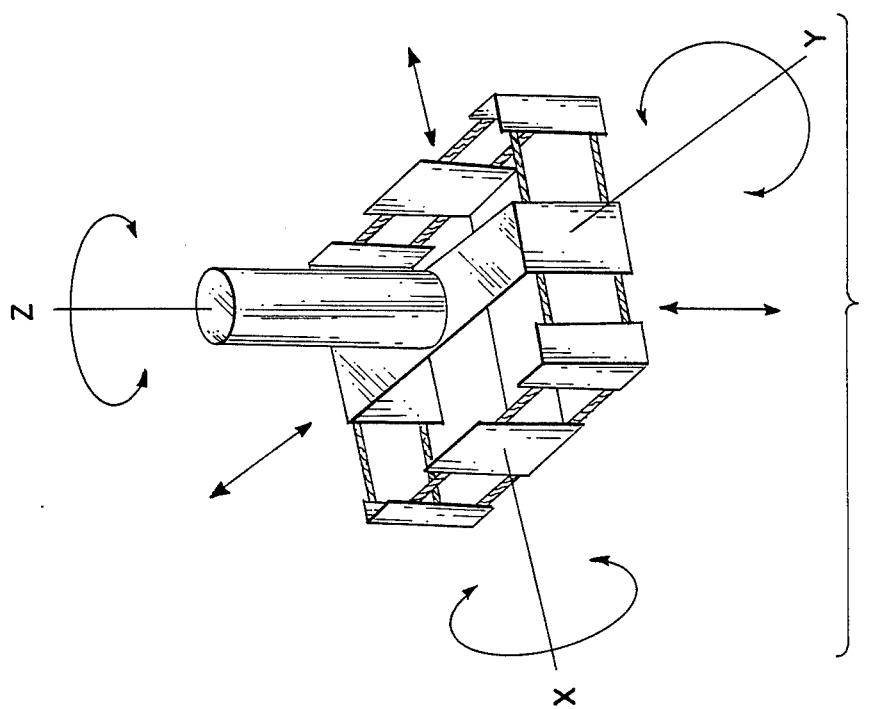
FIG. 6 illustrates the six degrees of freedom exhibited by the present invention.

FIG. 6 illustrates the six degrees of freedom inherent to the invention. These six degrees are, as shown, the ability to translate along the "X", "Y" and "Z" axes as well as to rotate around each of these axes. It is important to note that these six degrees of freedom are referenced to a single point, that point being the center of geometry of the joint. It is important to have these six degrees of freedom because this allows for a simplified robotic system, in terms of its software programming, to achieve any desired movement. Further, it is important to have these six degrees of freedom through the joint's center of geometry because rotation and translation can be isolated and controlled, i.e., translation along an axis will not result in any rotation and rotation about an axis will not result in any translation.

Figure 7A:
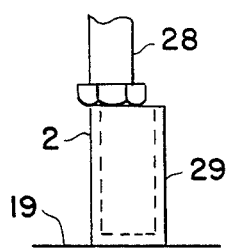
FIGS. 7a through 7g show one possible mode of operation of the present invention with the robotic joint having a socket wrench grasping and then turning a bolt.
Figure 7E:
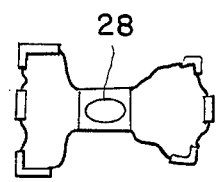
Figure 7B:
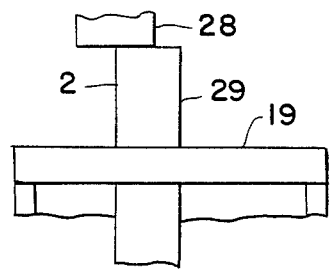
Figure 7C:
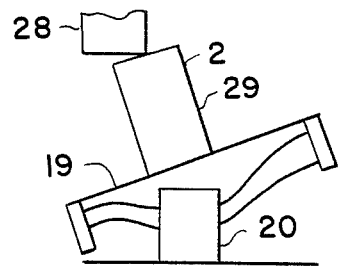
Figure 7F:
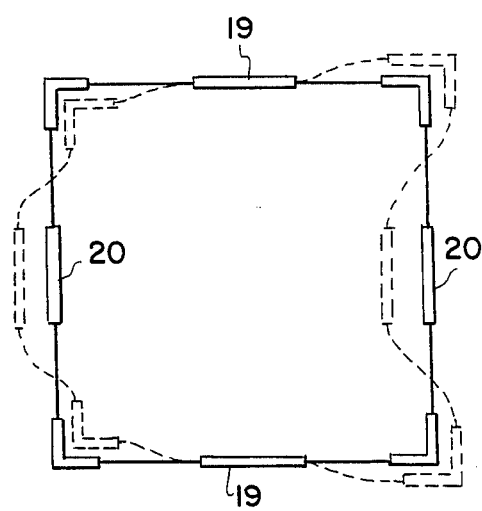
Figure 7D:
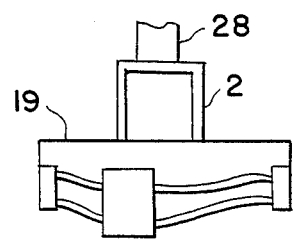
Figure 7G:
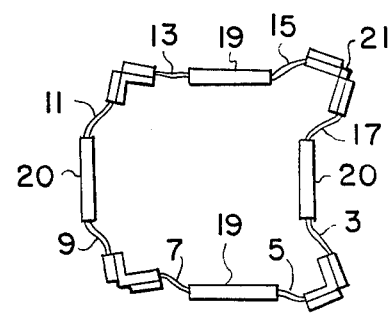

FIGS. 7a through 7e illustrate how a robot, equipped with the instant invention and employing a socket wrench 2 as the end-effect tool, can grasp the end of a bolt and rotate the bolt, either in or out of its pre-access condition. It is very important to recognize, that to fully take advantage of the invention, the robotic system be able to manipulate its arm angularly, vertically, laterally, translationally, both in and out, and rotationally, either clockwise or counter-clockwise. As illustrated, FIGS. 7a and 7b show the socket wrench 2 up against a bolt head 28, but misaligned, after the robot arm 20 has translated the joint and wrench combination up against the bolt head. Because of the resulting movement, the socket wrench will become angularly offset as shown in FIG. 7c with the cable segments being distorted as illustrated. In the next step of the robot operation, the robot arm must be rotated and, as it rotates, the socket wrench will fit itself around the bolt head 28, as shown in FIGS. 7d and 7e, and the cable segments will become and remain parallel in the "X" and "Y" axes. FIGS. 7f and 7g illustrate how the cable segments, as viewed along the "Z" axis, will distort as torque is applied to the bolt and the bolt rotates, the distortion in the "X", "Y" plane rotating with the rotation of the bolt. FIG. 7f illustrates a combination of translational and rotational cable segment movement, and FIG. 7g illustrates cable action in a compliant system as the system adapts to extreme misalignment.

Figure 8:
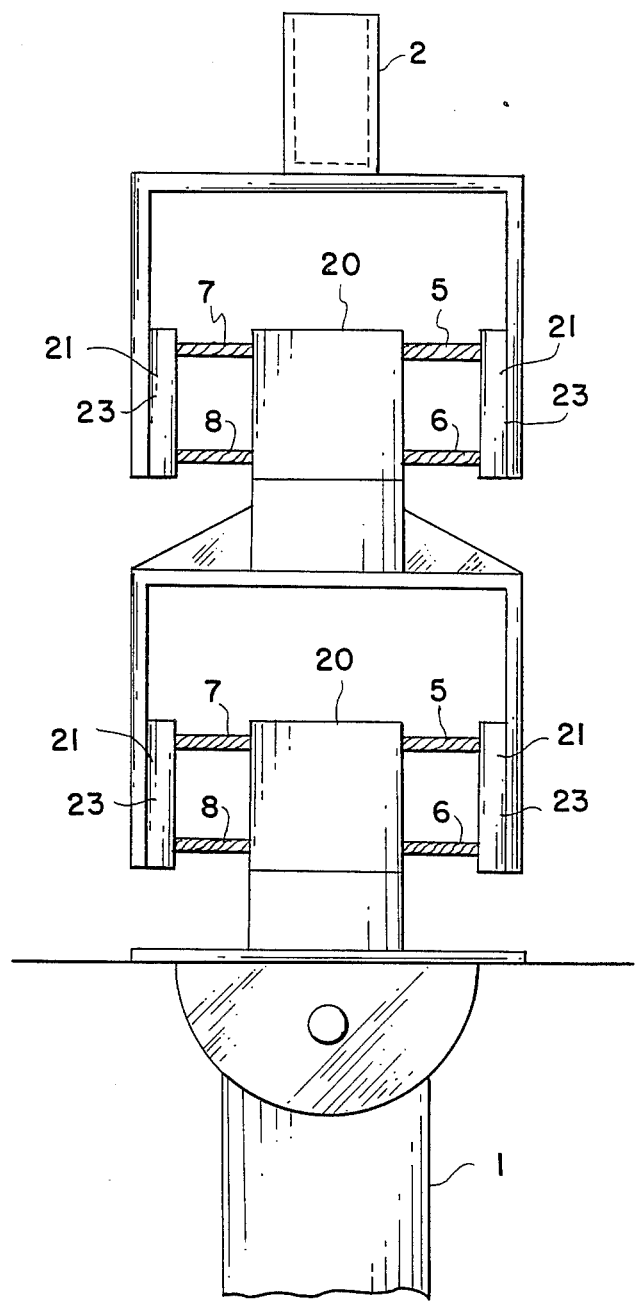
FIG. 8 depicts the side view of another embodiment of the invention with a compound robotic joint comprised of two stackable compliant joints.

FIG. 8 shows two compliant joints as generally shown in FIG. 1. A pivoted robot arm is attached to bracket 20 of the first joint and the first joint is, in turn, attached to bracket 20 of the second joint. The purpose of the stacking of the individual joints to achieve a compound robotic joint may achieve additional compliance that may not be otherwise available. In particular, it may allow for more effective robot manipulation. Likewise, FIG. 9 illustrates the use of two individual joints to form a universal joint which is useful for achieving effective access to remote work objects and to increase effective robot manipulation.

Figure 10:
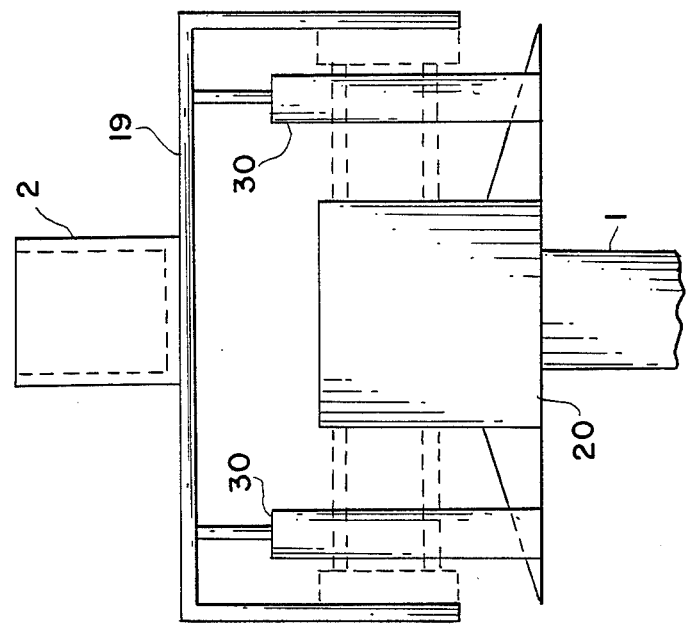
FIG. 10 shows the compliant joint of this invention including displacement sensors.

FIG. 10 shows a side view of a robotic joint according to that of FIG. 1, looking along the "X" axis, where two displacement sensors 30 have been interposed between brackets 19 and 20. Not shown are two other sensors 30 directly behind the two illustrated sensors. The four sensors are in quadrature and can develop signals which can effectively show the changes in position between the brackets 19 and 20 as more fully described in FIG. 15, infra.

FIGS. 11a through 11f show two, three dimensional views illustrating how the cable angles may be variously machined to develop more or less compliance by varying cable segment angles as previously described in FIGS. 5d and 5e.

Figure 12:
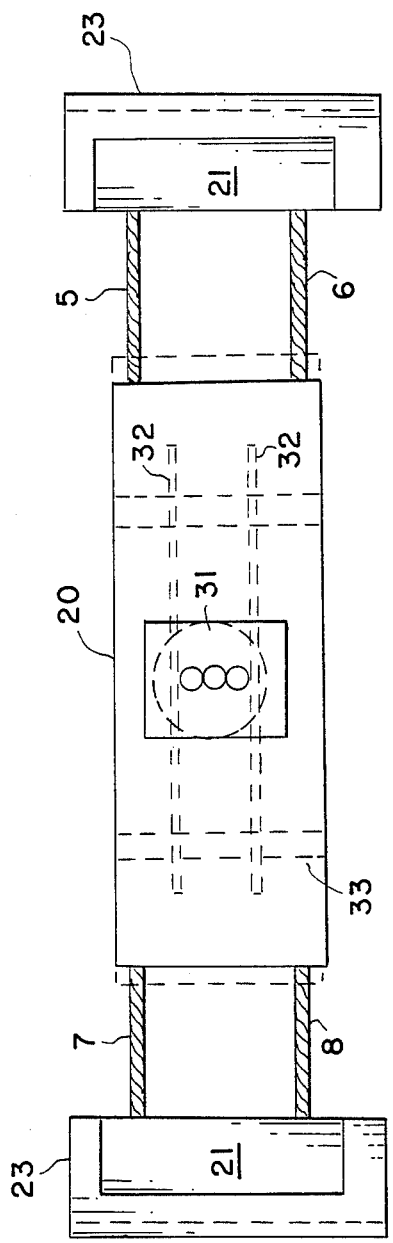
FIG. 12 depicts the top view of a portion of the robotic joint of the invention with a servo-motor driven worm drive.
Figure 13:
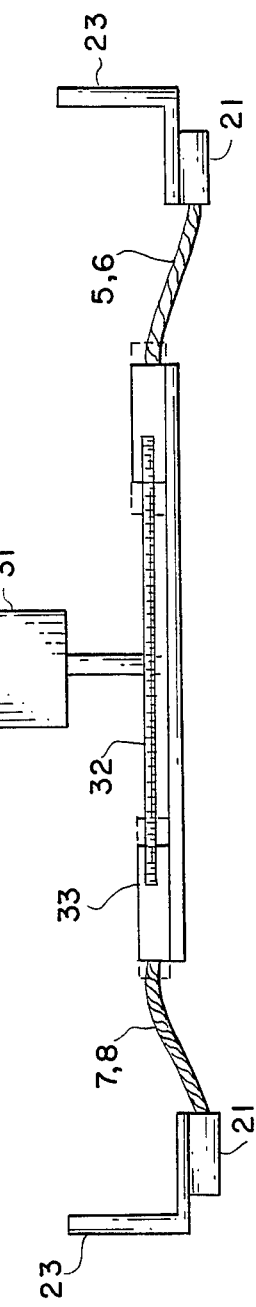
FIG. 13 depicts the side view of a portion of the robotic joint of the invention with a servo-motor driven worm drive.

FIG. 12 shows how the compliance of the joint may be varied in the "X", "Y" plane by the use of a worm drive 32 and by employing a somewhat different cable end 33, attaching the cable to the worm drive 32. FIG. 13 is a side view of FIG. 12. Also shown in FIGS. 12 and 13 is how this variation in compliance may be achieved remotely by using a servo-motor 31 to expand or contract the distance between adjacent cable ends of different cable segments in the same set. As shown in FIG. 12, clockwise and counter-clockwise rotation of the servo-motor results in movement of either the left or right worm drive screws which either pushes the cable segments in or out, respectfully.

Figure 14:
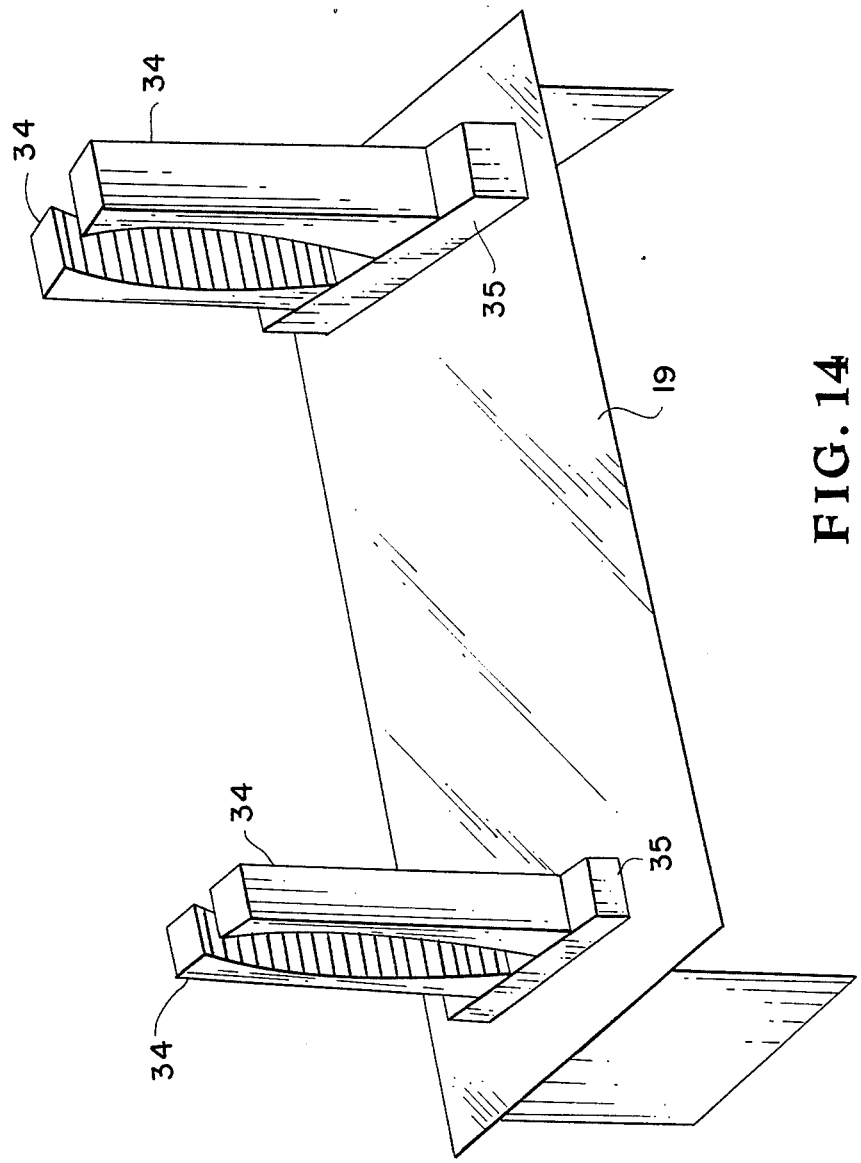

FIG. 14 illustrates a clamping tool which is another possible tool configuration for use with the use with the instant invention. As shown, two pairs of grippers 34 are mounted on their respective solenoid gripper actuators 35, which, in turn, are mounted on the tool frame control 19, one of the two brackets employed, for instance, in FIG. 1. In operation, the robot, through its arm, would direct the clamping tool towards an object to be grasped, for instance, a pipe, with the solenoid actuators leaving the grippers in an open position. As the grippers generally access the pipe, or another elongated object, the grippers may be closed by the actuators. By having the grippers mounted on a cable-compliant robotic joint according to the invention, the grippers may firmly grasp a pipe or similar object, even though a substantial misalignment may initially exist between the clamping tool and the pipe.

Figure 15:
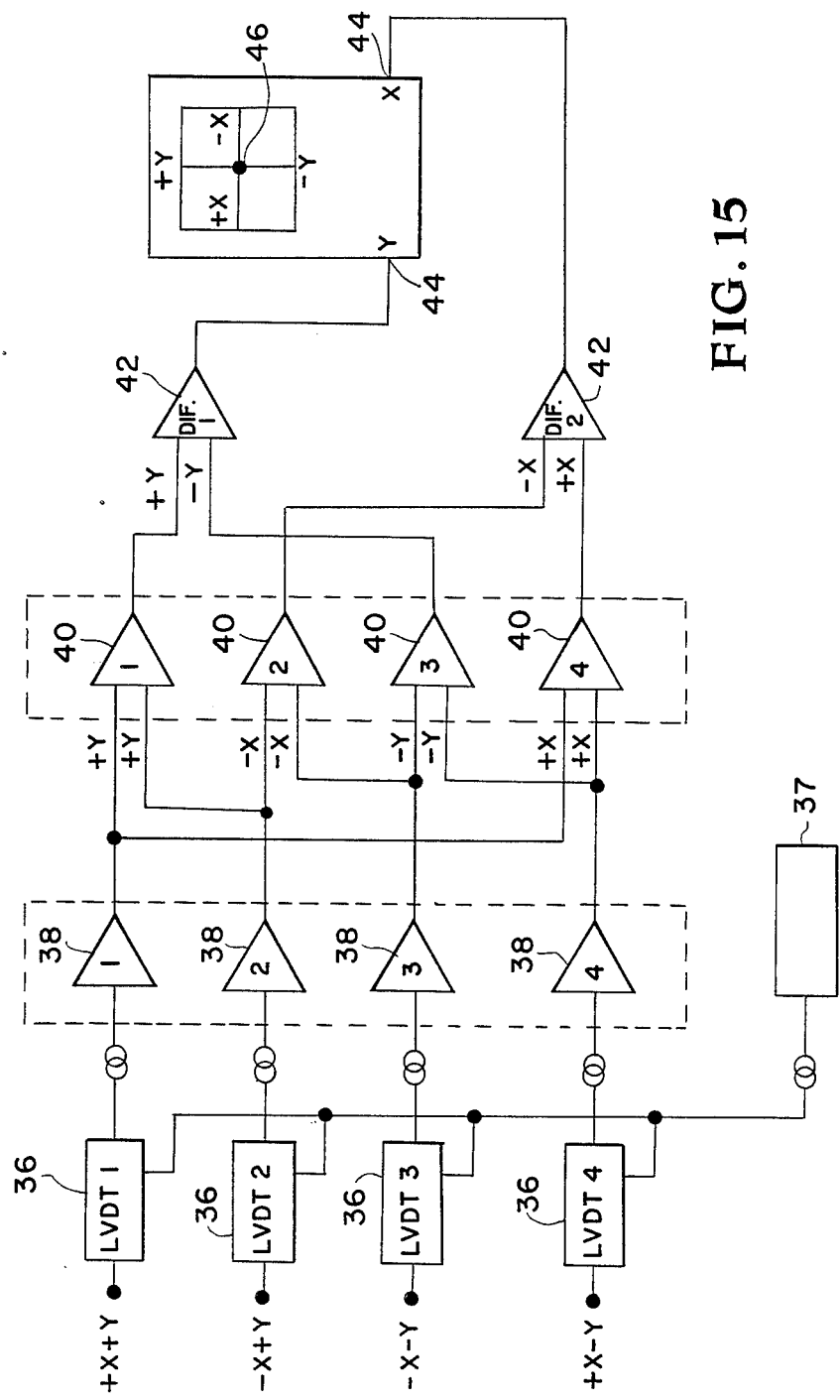

In FIG. 15, four linear variable differential transformers ("LVDTs") 36 which may be displaced between the compliant joint brackets, as partially shown in FIG. 10, sense varying displacement during robot operations. The transformers 36 operate on a.c. signals which are developed from internal oscillators powered by the 6 V d.c. power supply 37. The larger a.c. signals, converted internally to d.c. signals, indicate larger displacements. These d.c. signals are fed into a signal conditioner which contains four operational amplifiers 38, one for each of the four transformers 36. These operational amplifiers 38 are adjustable in terms of gains as well as output, a zero or null signal corresponding to each transformer's static position. During operation, as the distance between the bracket changes, more and less, from the static position, the operational amplifier outputs will vary, plus and minus, about the zero position. The outputs from the signal conditioner operational amplifiers 38 are inputted to another group of four operational amplifiers 40 configured as summing amplifiers 40 and two operational amplifiers configured a differential amplifiers 42 whose outputs may then be employed to drive oscilloscope X, Y coordinate amplifiers 44 to, in turn, indicate the relative robotic joint position. These outputs may also employed as feedback control signals to aid in changing the joint position. Alternatively, the oscilloscope "dot" 46 may be used, with human intervention, to aid in changing joint position to acquire a work object.

I claim:

1. A cable-compliant robotic joint including:
a plurality of brackets, two of said brackets having an essentially "U" configuration cross-section, the other of said brackets being angle brackets, said two U-shaped brackets having their said "U" configuration cross-sections in substantially different, orthogonal planes;
first means for coupling one of said U-shaped brackets to a robotic arm;
second means for coupling said other of said U-shaped brackets to an end-effect tool, said tool having a major axis being defined as the general translation direction that the tool must travel to approach a work object;
a plurality of cable segments, said segments having longitudinal axes which lie substantially in at least two planes, all of said at least two planes being orthogonal to said planes of said "U" cross-sections of said two U-shaped brackets and generally perpendicular to said tool major axis, all of said plurality of said brackets having means to retain said cable segments, wherein one end of each of said cable segments is secured to one of said angle brackets and the other end of each of said cable segments is secured to one of said two U-brackets, wherein said angle brackets are circumferentially interposed between the adjacent legs of said U-shaped brackets, and wherein said cable segments permit compliant movement of said robotic joint.

2. The cable-compliant robotic joint of claim 1 wherein each of said planes in which said cable segments lie contain a plurality of segments, said plurality of cable segments in each of said planes in which said cable segments lie defining a cable segment set.

3. The cable-compliant robotic joint of claim 1 wherein said first means for coupling is connected to a robotic arm.

4. The cable-compliant robotic joint of claim 3 wherein one of said includes a means for coupling to another cable-compliant robotic joint to obtain a compound robotic joint.

5. The cable-compliant robotic joint of claim 1 wherein said cable segments are provided with a swage at each end to provide a more secure clamp when said cable segment ends are placed into cable end retainers.

6. The cable-compliant robotic joint of claim 5 wherein said swage is a copper swage.

7. The cable-compliant robotic joint of claim 1 wherein said second means for coupling is connected to a tool.

8. The cable-compliant robotic joint of claim 1 wherein said first and second means for coupling are connected to both a robotic arm and a tool, respectively

* * * * *